(12) United States Patent
Wang et al.

(10) Patent No.: US 7,139,790 B1
(45) Date of Patent: Nov. 21, 2006

(54) WEAK LEADER ELECTION

(75) Inventors: Yi-Min Wang, Bellevue, WA (US);
Wilf G. Russell, Redmond, WA (US);
Anish K. Arora, Columbus, OH (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 09/641,553

(22) Filed: Aug. 17, 2000

Related U.S. Application Data

(60) Provisional application No. 60/149,390, filed on Aug. 17, 1999, provisional application No. 60/184,631, filed on Feb. 24, 2000.

(51) Int. Cl.
G06F 15/16 (2006.01)

(52) U.S. Cl. ............. 709/201; 709/220; 709/221; 709/237; 714/4; 714/11; 370/216

(58) Field of Classification Search ........ 709/201–202, 709/205, 206, 220–224, 226, 237–238; 714/2, 714/4, 11–12, 31, 41, 736; 370/216, 242–245
See application file for complete search history.

(56) References Cited

U.S. PATENT DOCUMENTS

| 5,029,159 A | * | 7/1991 | Dolev ..................... 370/216 |
| 5,408,619 A |   | 4/1995 | Oran |
| 5,579,221 A |   | 11/1996 | Mun |
| 5,621,662 A |   | 4/1997 | Humphries et al. |
| 5,692,215 A |   | 11/1997 | Kutzik et al. |
| 5,699,501 A | * | 12/1997 | Badovinatz et al. ............ 714/4 |
| 5,787,250 A | * | 7/1998 | Badovinatz et al. ........ 709/201 |
| 5,796,602 A |   | 8/1998 | Wellan et al. |
| 5,812,533 A |   | 9/1998 | Cox et al. |
| 5,870,545 A | * | 2/1999 | Davis et al. ................ 709/201 |
| 5,922,050 A |   | 7/1999 | Madany |
| 5,987,376 A | * | 11/1999 | Olson et al. ................ 701/201 |
| 6,044,476 A | * | 3/2000 | Ote et al. ..................... 714/31 |
| 6,108,614 A |   | 8/2000 | Lincoln et al. |
| 6,108,699 A | * | 8/2000 | Moiin ........................ 709/201 |
| 6,112,237 A |   | 8/2000 | Donaldson et al. |
| 6,185,611 B1 |  | 2/2001 | Waldo et al. |
| 6,192,282 B1 |  | 2/2001 | Smith et al. |
| 6,195,243 B1 |  | 2/2001 | Spencer et al. |
| 6,195,591 B1 |  | 2/2001 | Nixon et al. |
| 6,199,180 B1 | * | 3/2001 | Ote et al. .................... 714/31 |

(Continued)

FOREIGN PATENT DOCUMENTS

EP 0 778 684 A2 6/1997

(Continued)

OTHER PUBLICATIONS

Hector Garcia-Molina, Elections in a distributed computing system, IEEE Transactions on Computers, 1982, 31, pp. 148-159.

(Continued)

Primary Examiner—Bharat Barot
(74) Attorney, Agent, or Firm—Microsoft Corporation

(57) ABSTRACT

A weak leader election approach to determine which of a number of redundant nodes is the leader node is disclosed. The redundant nodes exchange information particular to them, such as age information. Based on the information received from the other nodes, each node determines whether it is the leader. Where the information is age information, a criteria that can be used to make this determination is that the oldest node is the leader. Each redundant node knows only whether it is the leader node. Redundant nodes that are not the leader do not know which node is the leader node.

14 Claims, 11 Drawing Sheets

U.S. PATENT DOCUMENTS

| | | | |
|---|---|---|---|
| 6,223,149 B1* | 4/2001 | Margulis et al. | 703/27 |
| 6,269,378 B1 | 7/2001 | Quirt | |
| 6,311,209 B1* | 10/2001 | Olson et al. | 709/204 |
| 6,427,163 B1* | 7/2002 | Arendt et al. | 709/201 |
| 6,463,532 B1* | 10/2002 | Reuter et al. | 709/224 |
| 6,507,863 B1* | 1/2003 | Novaes | 709/201 |
| 6,560,636 B1* | 5/2003 | Cohen et al. | 709/203 |
| 6,748,438 B1* | 6/2004 | Palmer et al. | 709/220 |
| 6,839,752 B1* | 1/2005 | Miller et al. | 709/220 |
| 2003/0041138 A1* | 2/2003 | Kampe et al. | 709/223 |

FOREIGN PATENT DOCUMENTS

EP  0 932 275 A2  7/1999

OTHER PUBLICATIONS

L Zhang et al, RSVP: a new resource reservation protocol, IEEE Network, vol. 7, No. 5, pp. 8-18, Sep. 1993.

S. Raman et al, A model, analysis, and protocol framework for soft-state based communication, in Proceedings of SIGCOMM, pp. 15-25 (1999).

A. Arora et al, A timing-based schema for stabilizing information exchange in networks, in Proceedings of Int'l Conference on Computer Networks, 1995.

S. Floyd et al, A reliable multicast framework for light-weight sessions and application level framing, Proceedings of SIGCOMM, Sep. 1995.

X10 FAQ, May 16, 1996, ftp://ftp.scruz.net/users/cichlid/public/x10faq.

M. Handley, SAP: Session Announcement Protocol, Internet Engineering Task Force, Internet-Draft, draft-ietf-mmusic-sap-00.txt, Nov. 19, 1996.

N. Lynch, Distributed Algorithms, Morgan Kaufmann Publishers: 1997, chapters 3, 4, 4.1, 5, 6, 7, 12, 14, 15.1, 15.2, 16, 16.5.1, 19, 21, 22.5.

Edwards, W. Keith, Core Jini, Prentice-Hall (1999) Chapter 2, 3, 4, 6, 7, 8, and 12.

*The HAVi Specification: Specification for the Home Audio/Video Interoperability (HAVi) Architecture.* Version 1.0 beta (Nov. 19, 1998). p. 9, ¶ 2.2.3; p. 353, å 10.3; p. 354, ¶ 10.5.

Arora, A. et al., "Component Based Design of Multitolerant Systems," *IEEE Transactions on Software Engineering,* vol. 24, No. 1, pp. 63-78 (1998).

Czwewinski, S.E., "An Architecture for a Secure Service Directory Service," *Proceedings of 5th Annual International Conference on Mobile Computing and Networks (MobiCom '99),* pp. 24-35 (1999).

Goland, et al., "Simple Service Discovery Protocol/1.0: Operating without an Arbiter," *Internet Engineering Task Force,* Internet Draft, pp. 1-18 printed at http://www.globecom.net/ietf/draft/draft-cai-ssdp-v1-03.txt (1999).

RIS, H.R., "EIB-Bus—Europaischer Installationsbus Teil 2," *Elektrotechnik,* vol. 44, No. 10, pp. 61-67 (1993).

* cited by examiner

WEAK LEADER ELECTION

RELATED APPLICATIONS

This patent application claims priority to and the benefit of the previously filed provisional patent applications "Home Networking," filed on Aug. 17, 1999, and assigned Ser. No. 60/149,390, and "Home Networking System," filed on Feb. 24, 2000, and assigned Ser. No. 60/184,631.

FIELD OF THE INVENTION

This invention relates generally to a distributed system, such as an automation system, and more particularly to a distributed system having a number of redundant nodes among which a leader node is elected.

BACKGROUND OF THE INVENTION

Home networking and automation have become more popular. With the number and complexity of audio/video equipment increasing, some homeowners are interested in operating their equipment more easily. Other homeowners are more concerned about the security and safety of their homes. These homeowners may want to remotely monitor their homes, remotely control appliances and other power line devices, and learn when important events occur. For example, an important event can be the hot water heater bursting or leaking, or another type of event. Power line devices are devices that connect to the power line, usually through a plug that connects to an electrical outlet.

Currently, there are two popular home networking infrastructures. The first is phone line networking. To provide in-home networking of computers and computer peripherals without requiring home rewiring, as is usually required with standard Ethernet networks, the Home Phone line Networking Alliance (HomePNA) was formed to leverage the existing phone lines in homes. More detailed information regarding the HomePNA can be found on the Internet at www.homepna.com. While phone line networking allows homeowners to create small local-area networks (LAN's) within their homes for the purposes of connecting computers and computer peripherals, it has limitations. Significantly, phone line networking typically does not allow homeowners to control appliances, lamps, and other power line devices within their homes.

A second home networking infrastructure is power line networking. Power line networking provides ubiquitous wired connectivity throughout the majority of homes. One type of power line networking is known as X10. X10 is a communications protocol that allows for remotely controlling power line devices, such as lamps and appliances. More detailed information regarding the X10 protocol can be found on the Internet at ftp://ftp.scruz.net/users/cichlid/public/x10faq.

Current power line networking, such as X10 networking, is limited. The X10 protocol, for example, provides only a rudimentary and low-level framework for controlling and monitoring power line devices. The framework generally does not allow for sophisticated and complex device control applications. While automation systems employing existing X10 technology can be implemented using computers, more typically the systems are implemented with relatively less intelligent control centers that only govern a limited number of power line devices, in a limited manner. When computers are used, the resulting systems are still far from ideal. They may be difficult to use, and may not be reliable or robust against equipment failures and crashes.

An intelligent, reliable, and robust automation system that overcomes these problems is described in the cofiled patent application entitled "Automation System for Controlling and Monitoring Devices and Sensors". The automation system includes system management daemons to detect problems within the system and initiate appropriate recovery actions. There can be more than one instance of each daemon for redundancy purposes. To determine which instance is the leader instance that should actively respond to requests made to the daemon, a weak leader approach is used. This approach is the subject of this patent application.

SUMMARY OF THE INVENTION

The invention relates to a weak leader election approach to determine a leader among a number of redundant nodes. The approach can be used in conjunction with an automation system designed to control and monitor devices and sensors, and that has redundant nodes. The redundant nodes can be redundant daemon instances, redundant computers, or other types of redundant nodes. The devices can include power line devices, such as lamps, appliances, audio/video equipment, and other devices that connect to the power line of a house or other building. The sensors can include sensors for detecting the occurrence of emergency-related and other events. For example, a water sensor located near a hot water heater can detect whether the heater has burst.

In the weak leader election approach, the redundant nodes of a distributed system exchange information particular to them. For example, the information can be age information. Based on the information received from the other redundant nodes, each node determines whether it is the leader node. In the case where the information is age information, a criteria that can be used to make this determination is that the oldest node is the leader node. Each redundant node knows only whether it is the leader. Redundant nodes that are not the leader do not know which node is the leader node.

The invention can be used in conjunction with an automation system, such as the automation system described in this patent application. The invention can also be used in conjunction with other types of distributed system, or independently from a system. The invention encompasses methods, systems, distributed systems, automation systems, and automation system architectures of varying scope. Other aspects, embodiments and advantages of the invention, beyond those described here, will become apparent by reading the detailed description and by referencing the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Automation System Hardware Architecture

Figure 1:
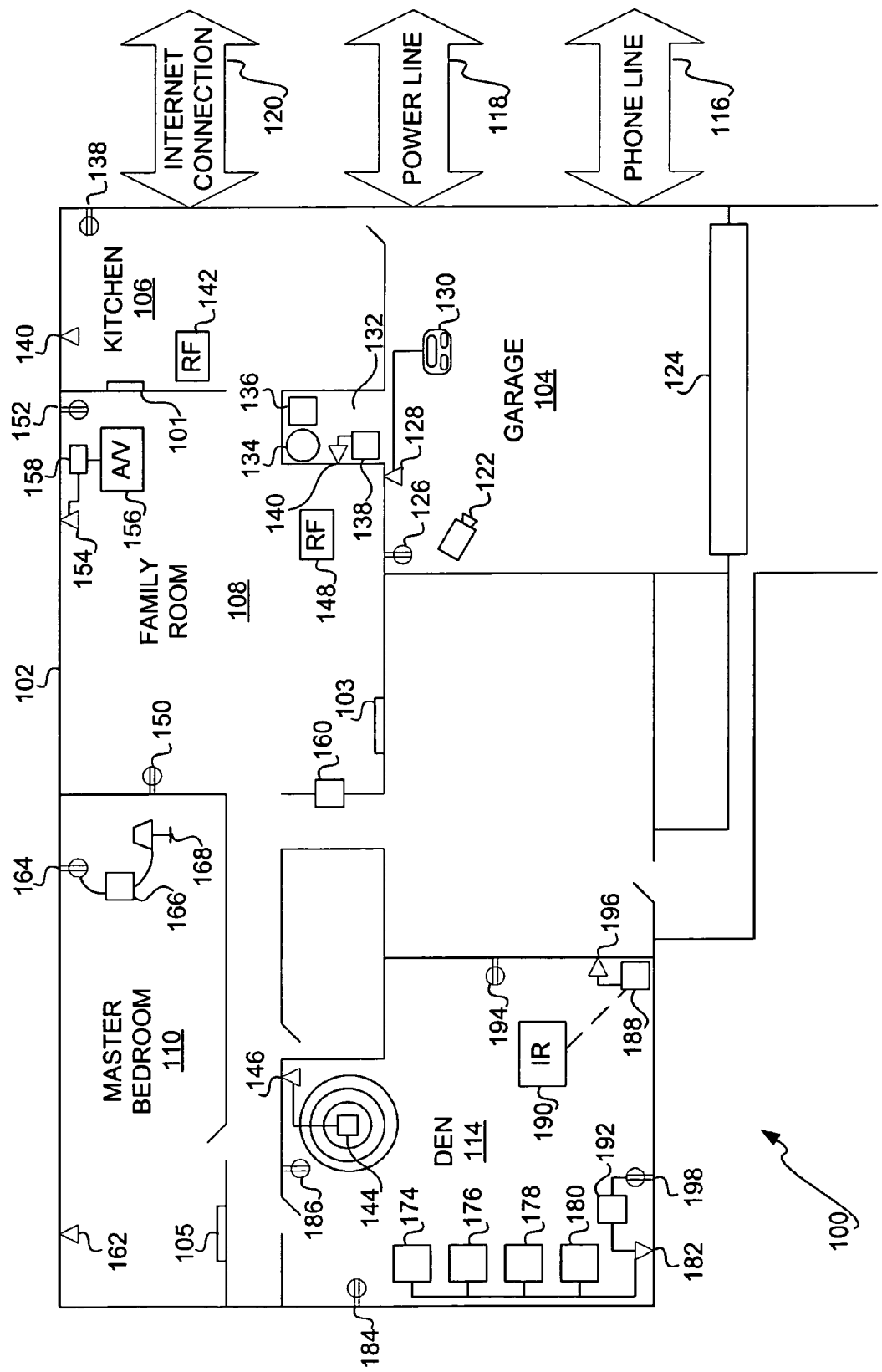
FIG. 1 is a pictorial diagram of an example house in which an automation system can be implemented.

FIG. 1 shows a pictorial diagram 100 of an example house 102 in which an automation system can be implemented. The house 102 includes a garage 104, a kitchen 106, a family room 108, a master bedroom 110, and a den 114, among other rooms. Connections coming into and distributed throughout the house 102 include a phone line 116, a power line 118, and an Internet connection 120. The phone line 116 allows residents of the house 102 to place and receive phone calls. The power line 118 provides electrical power to the house 102. The Internet connection 120 connects the house 102 to the Internet. The Internet connection 120 can be a fast, always-on broadband connection, such as a cable modem connection or a Digital Subscriber Loop (DSL) line. The Internet connection 120 may also be a slow, dial-up connection that utilizes the phone line 116.

Not specifically called out in FIG. 1 is that a network has been set up within the house 102. The network is of the type that connects computers and computer peripherals with one another. For example, the network may be an Ethernet network, using dedicated wiring, or using the existing phone line 116. The network may also be a wireless Ethernet network, or another type of network. For purposes of descriptive clarity, this network is referred to as the backbone network in the detailed description. The backbone network is distinct from a power line network, for example.

Each of the rooms of the house 102 has a number of network adapters and electrical outlets, as well as other types of components. The garage 104 has four components pertinent to the automation system. The video camera 122 allows remote monitoring of whether the garage door 124 is open or closed. The camera 122 is preferably directly connected to the backbone network set up within the house 102. The network adapter 128, as well as other network adapters throughout the house 102, provide for connectivity to the backbone network. The garage door opener 130 controls the opening and closing of the garage door 124, and is connected to the backbone network through the network adapter 128.

Electrical power devices that may be controlled using the automation system can be plugged into the electrical outlet 126, or into other electrical outlets throughout the house 102. Electrical power devices are also referred to as power line devices. Power line devices include appliances, lamps, audio/video equipment, and other types of devices that are plugged into electrical outlets. The power line devices are typically independent from one another. For example, a power line device that is a lamp is independent from a power line device that is a clock radio, in that the lamp and the clock radio are not aware of each other. The lamp and the clock radio can each be independently controlled by the automation system.

In an alcove 132 off the garage 104, there is a hot water heater 134 and a furnace 136. Relevant to the automation system is the water sensor 138, which is connected to the backbone network through the network adapter 140. The water sensor 138 is located on the floor of the alcove 132 and detects the presence water, which may indicate that the hot water heater 134 is leaking or has burst.

The kitchen 106 likewise has an electrical outlet 138 and a network adapter 140. As shown in FIG. 1, the kitchen also includes a radio-frequency (RF) device 142. The RF device 142 communicates with an RF bridge 144 that is wired to the backbone network. An example of the RF device 142 is a wireless temperature gauge that periodically sends the detected temperature via RF signals to the RF bridge 144. The den 114 in particular includes the RF bridge 144, connected to the backbone network through the network adapter 146, with which the RF device 142 communicates. The family room 108 also has an RF device 148. The RF bridge 144 receives RF signals transmitted by the RF devices 142 and 148, and passes them through to the backbone network set up in the house 102 via the network adapter 146. The RF bridge 144 also receives data from the backbone network intended for the RF devices 142 and 148, and passes them through to the devices 142 and 148 by conversion to RF signals.

A user access point (UAP) 101 is located in the kitchen 106. The UAP 101, and other UAP's throughout the house 102, permit users of the automation system to interact with the system. The UAP 101 can be a touch-screen, flat-screen device mounted on a wall of the kitchen 106. The user provides input to the automation system by touching the device, and receives output from the system by viewing the screen of the device. The UAP 101 can also be a computer, or another type of device.

The family room 108, in addition to the RF device 148, includes electrical outlets 150 and 152, and a network adapter 154. Audio/video (A/V) devices 156 are connected to an A/V bridge 158, through which the A/V devices 156 can send and receive audio, video, and control signals through the backbone network set up in the house 102. The A/V bridge 158 is connected to the backbone network through the network adapter 154. The family room 108 has a thermostat 160 for controlling the heating and cooling system of the house 102. The heating and cooling system includes, for example, the furnace 136 in the alcove 132 off the garage 104. The thermostat 160 is preferably connected directly to the backbone network set up in the house 102. A UAP 103 is also located in the family room 108.

The master bedroom 110 has a network adapter 162 and an electrical outlet 164. Of particular relevance to the automation system is that a device adapter 166 is directly plugged into the electrical outlet 164, and a lamp 168 is plugged into the device adapter 166. The device adapter 166 allows the automation system to control non-intelligent power devices, such as the lamp 168. A subsequent section of the detailed description describes the construction and the use of the device adapter 166. A UAP 105 is also located in the master bedroom 110.

The den 114 is the room of the house 102 in which the heart of the automation system is located. There are four computing devices 174, 176, 178, and 180. The computing devices may be desktop or laptop computers, for example. The computing device 174 serves as the gateway device, through which the backbone network set up in the house 102 is connected to the Internet connection 120. The devices 176, 178, and 180 provide the hardware on which the software architecture of the automation system is implemented in a distributed manner. The software architecture is described in detail in a subsequent section of the detailed description. There is more than one such device for redundancy and reliability purposes. The devices 174, 176, 178, and 180 connect to the backbone network through the network adapter 182, and can receive power through the electrical outlet 184.

The four computing devices 174, 176, 178, and 180 can be located throughout the house 102, instead of in a single room, such as the den 114. This may be desirable where one or more of these computing devices also serve as a UAP. Furthermore, if a circuit breaker for the room where one of the computing devices is located trips, only one computing device is affected. The automation system will still be able to operate over the other, unaffected computing devices.

The RF bridge 144 of the den 114 allows the RF devices 142 and 148, in the kitchen 106 and the family room 108, respectively, to communicate with other devices on the backbone network set up in the house 102. The RF bridge 144 is connected to the backbone network through the network adapter 146, and receives power through the electrical outlet 186. There are two other bridges in the den 114, the IR bridge 188, and the power bridge 192. The infrared (IR) bridge 188 allows the IR device 190, and other IR devices, to communicate with devices on the backbone network. The IR device 190 sends IR signals to and receives IR signals from the IR bridge 188, and vice-versa. Examples of the IR device 190 include a video-cassette recorder (VCR) and a remote control, although the device 190 can be any type of device. IR signals differ from RF signals in that they require a direct line of sight between the sender and the receiver, unlike RF signals. The IR bridge 188 receives power from the electrical outlet 194, and is connected to the backbone network through the network adapter 196.

The power bridge 192 allows devices connected to the power line 118 of the house 102 via electrical outlets to communicate with devices on the backbone network. The power bridge 192 is connected to the backbone network through the network adapter 182, and through the electrical outlet 198 receives power and communicates with the devices connected to the power line 118. For example, the lamp 168 in the master bedroom 110 can be controlled and monitored by the automation system. The device adapter 166 situated between the lamp 168 and the electrical outlet 164 sends and receives signals over the power line 118. The power bridge 192 transfers these signals from the power line 118 to the backbone network set up in the house 102.

While the automation system has been shown in FIG. 1 as implemented in a house, the system can also be implemented in other types of buildings as well. For example, the automation system can be implemented in an office building, a church, a store, a mall, or another type of building. The automation system can also be implemented without regard to a physical structure, such as a building. The components controlled and used by the automation system of FIG. 1 are representative components, and are not all required to implement the automation system. As an example, the IR device 190 and the RF devices 142 and 148 may be omitted.

Figure 2:
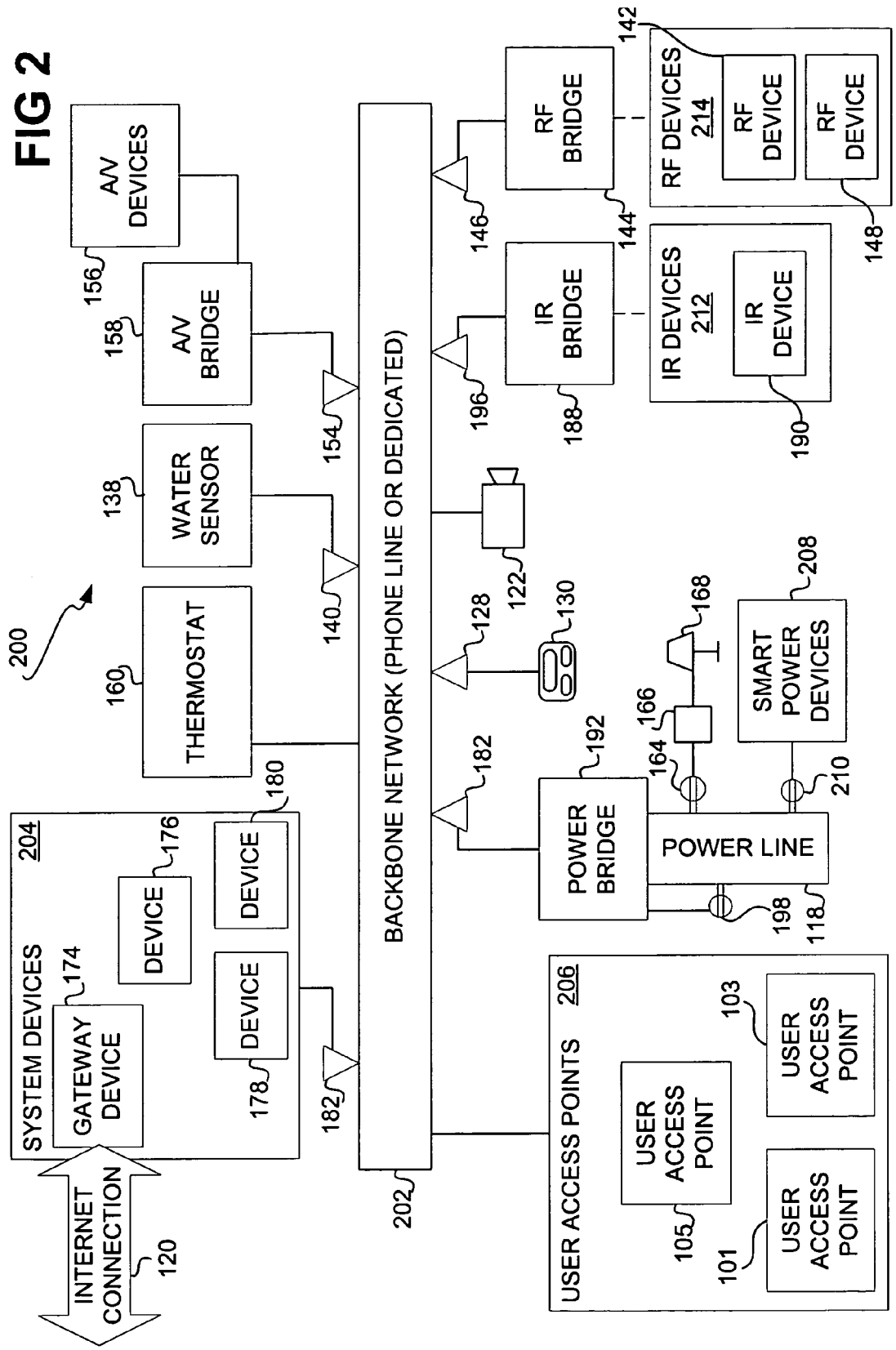
FIG. 2 is a topological diagram of the automation system of FIG. 1.

FIG. 2 shows a diagrammatic topology of the automation system of FIG. 1, providing another view of the system. The automation system is called out as the system 200 in FIG. 2. The backbone network 202 is preferably an Ethernet network, implemented over a dedicated line or over the phone line 116 of FIG. 1. The system devices 204 include the devices 174, 176, and 178. The devices 204 connect to the backbone network 202 through the network adapter 182. The device 174 is the gateway device that connects to the Internet connection 120. The user access points (UAP's) 206 include the UAP's 101, 103, and 105. The UAP's 206 are preferably directly connected to the backbone network 202. Likewise, the thermostat 160 is directly connected to the backbone network 202, whereas the water sensor 138 is connected to the backbone network 202 through the network adapter 140. The audio/video (A/V) devices 156 are connected to the A/V bridge 158, which is connected to the backbone network 202 through the network adapter 154. The A/V bridge 158 enables the A/V devices 156 to communicate with devices on the backbone network 202.

The power bridge 192 is connected to the backbone network 202 through the network adapter 182. Two instances of the same network adapter 182 are shown in FIG. 2 for illustrative clarity. The power bridge 192 is connected to the power line 118 through the electrical outlet 198. Smart power devices 208 directly connect to the power line 118 through corresponding electrical outlets 210, and can directly communicate with the power bridge 192. By comparison, non-intelligent power devices require interstitial device adapters between them and their corresponding electrical outlets. For example, the lamp 168 requires the device adapter 166 between it and the electrical outlet 164 for the automation system to control and monitor the lamp 168. Moving to the right of the power bridge 192 on the backbone network 202 in FIG. 2, the garage door opener 130 is connected to the backbone network 202 through the network adapter 128. The video camera 122 is directly connected to the backbone network 202.

The infrared (IR) bridge 188 is connected to the backbone network 202 through the network adapter 196, while the radio frequency (RF) bridge 144 is connected to the backbone network 202 through the network adapter 146. The IR bridge 188 enables the IR devices 212, such as the IR device 192, to communicate with devices on the backbone network 202. Likewise, the RF bridge 144 enables the RF devices 214, such as the RF devices 142 and 148, to communicate with devices on the backbone network 202.

Automation System Software Architecture

Figure 3:
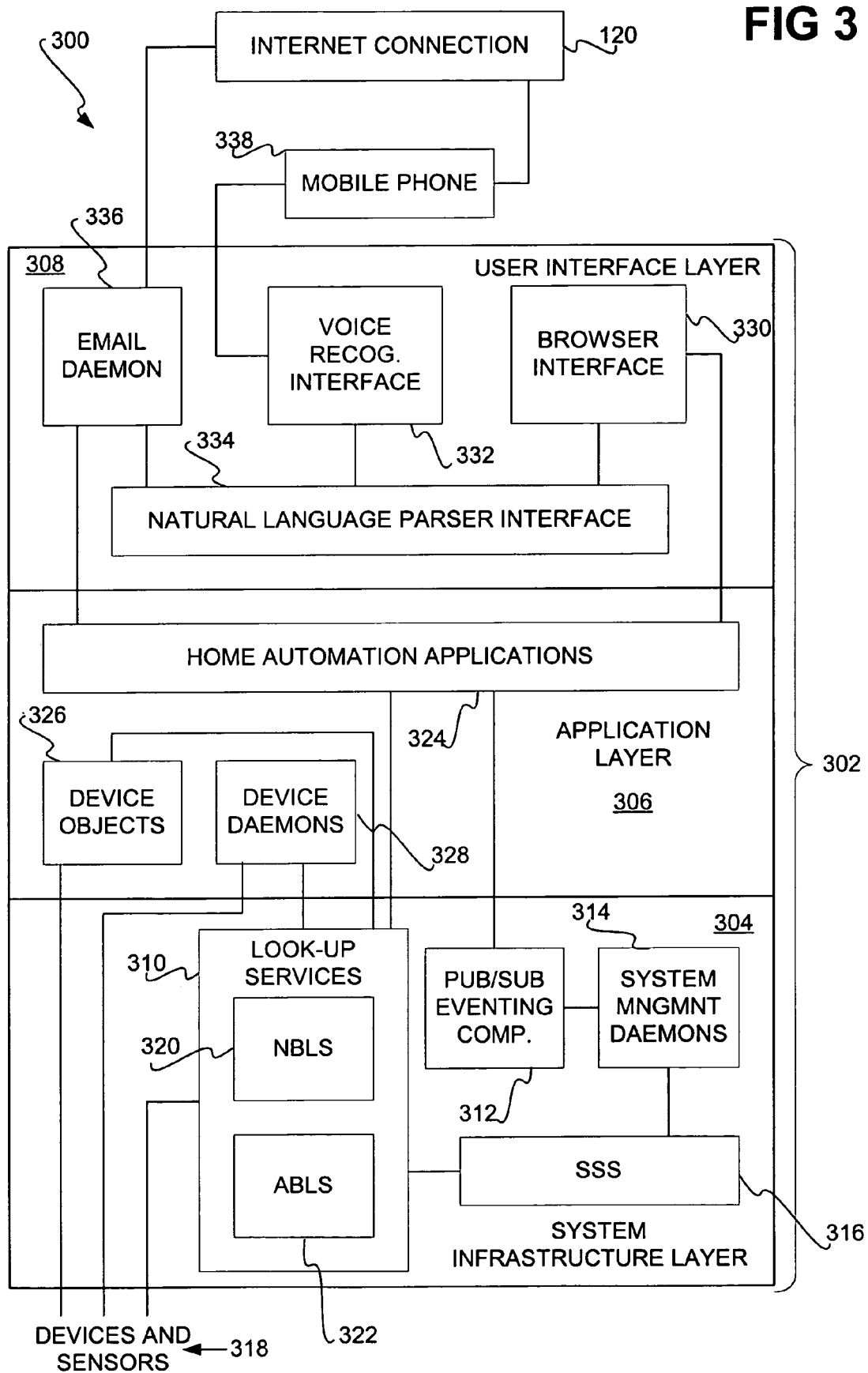
FIG. 3 is a diagram of a software architecture that can implement the automation system of FIGS. 1 and 2.

FIG. 3 is a diagram 300 showing a software architecture 302 for the automation system described in the previous section of the detailed description. The software architecture 302 specifically has three layers, a system infrastructure layer 304, an application layer 306, and a user interface layer 308. The software architecture 302 is preferably implemented over the system devices 204 of FIG. 2, such as the devices 176, 178, and 180. An overview of each layer of the architecture 302 is described in turn. The architecture 302, which is the central and critical aspect of the software architecture, is then described in more detail.

The system infrastructure layer 304 includes look-up services 310, a publication/subscription eventing component 312, system management daemons 314, and a soft-state store 316. The soft-state store 316 manages the lifetime and replication of soft-state variables. The publication/subscription eventing component 312 enables objects, daemons, programs, and other software components to subscribe to events related to changes in the soft-state store 316. The look-up services 310 interact with devices and sensors of the automation system, which are indicated by the arrow 318. Specifically, the look-up services 310 include a name-based look-up service (NBLS) 320, and an attribute-based look-up service (ABLS) 322. The ABLS 322 maintains a database of available devices, and supports queries based on device attributes. The device attributes can include device type and physical location, among other attributes. The NBLS 320 maintains a database of running instances of objects, and supports name-to-object address mapping. The system management daemons 314 of the system infrastructure layer 304 detect failures of devices, and initiate recovery actions.

The application layer 306 includes automation applications 324, device objects 326, and device daemons 328. There are two types of automation applications 324, device-control applications, and sensing applications. Device-control applications receive user requests as input, consult the look-up services 310 to identify the devices and the device objects 326 that should be involved, and perform actions on them to satisfy the requests. The device objects 326 correspond to the devices and sensors identified by the arrow 318. The device objects 326 encapsulate device- and network-specific details of their corresponding devices, and present interfaces for them, such as method calls. Examples of the device objects 326 include camera objects for taking snapshots and recording video clips, and garage door opener objects for operating garage doors.

Sensing applications monitor environmental factors, and take actions when a monitored event occurs. The sensing applications subscribe to events through the eventing component 312. Device daemons 328 interact with the devices and sensors identified by the arrow 318, and independently act as proxies for them. For example, a device daemon for a sensor can monitor sensor signals, and update appropriate soft-state variables in the soft-state store 316 to trigger events.

The user interface layer 308 provides user access to the system infrastructure layer 304 and the application layer 306. The user interface layer 308 has three parts, a web browser interface 330, a voice-recognition interface 332, and a text-based natural language parser interface 334. The browser interface 330 enables the user to browse through available devices, select devices based on attributes, and control the devices. The text-based natural language parser interface 334 is based on a vocabulary appropriate to an automation system, while the voice-recognition interface 332 employs voice recognition technology based on the same vocabulary.

The user interface layer 308 preferably supports remote automation. For example, when the Internet connection 120 is an always-on connection, the browser interface 330 can be used to access the automation system from remote locations. The natural language parser interface 334 provides an email-based remote automation interface. The email daemon 336 periodically retrieves email through the Internet connection 120, and parses automation-related requests contained in the email. The daemon 336 passes the requests to the automation applications 324, and optionally sends reply email confirming that the requested actions have taken place. Known digital signature and data encryption technologies can be used to ensure the security of the email. If the user has a mobile phone 338 that supports text messaging, the email daemon 336 can alert the user with text messages when predetermined events occur. The voice-recognition interface 332 can optionally be used with the mobile phone 338, or another type of phone.

Figure 4:
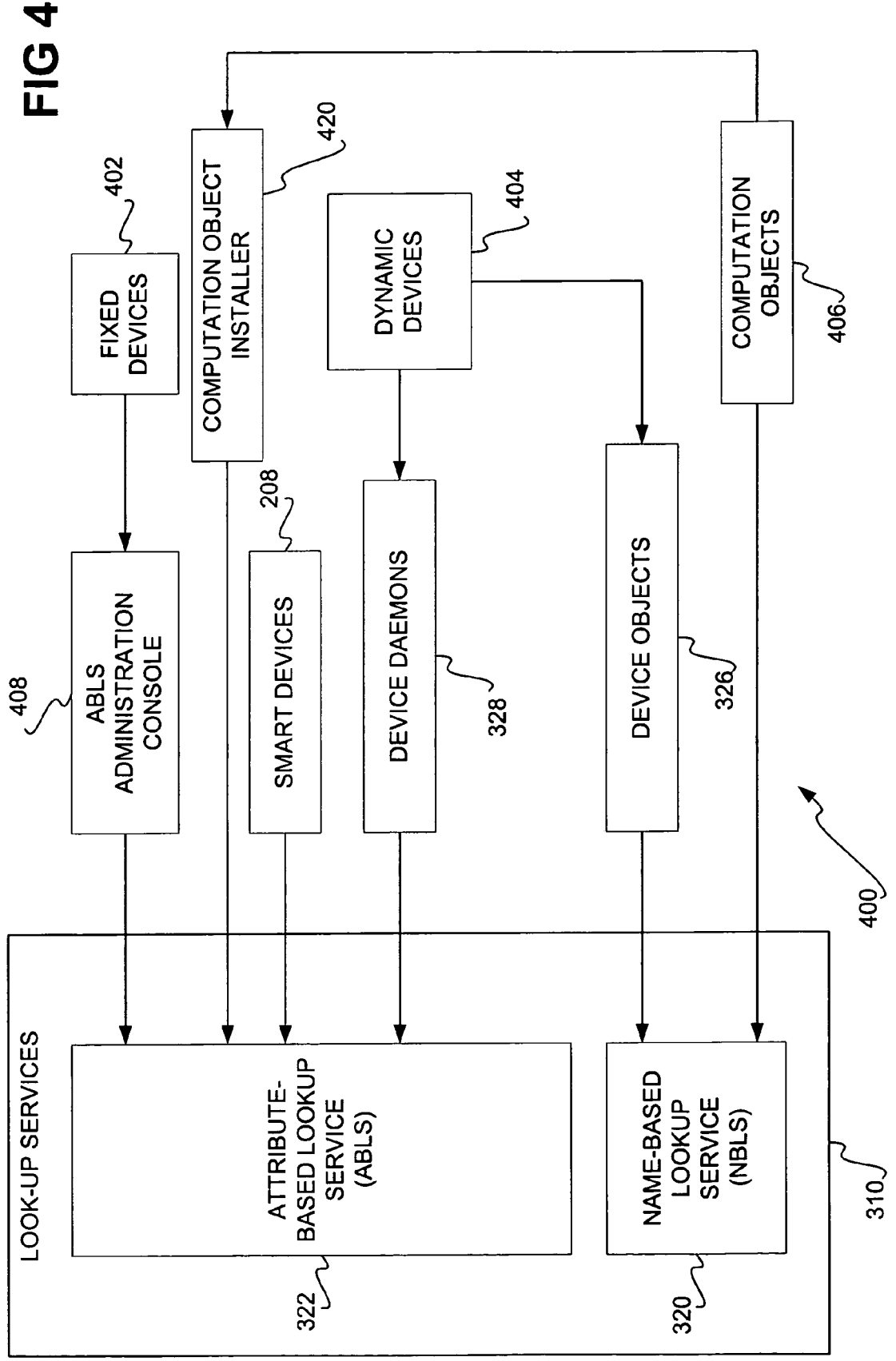
FIG. 4 is a diagram showing how devices, sensors, and objects are registered with the look-up services of the software architecture of FIG. 3.

FIG. 4 is a diagram 400 showing how one embodiment registers devices, sensors, and objects with the look-up services 310. The devices and sensors that are registered include the devices and sensors pointed to by the arrow 318 in FIG. 3. The devices include smart devices 208, fixed devices 402, and dynamic devices 404. Smart devices 208 are devices that do not need a device adapter to interact with the system. Fixed devices 402 are devices that are permanently affixed at their location, and cannot be moved. An example of a fixed device is the garage door opener 130 of FIGS. 1 and 2, which is permanently affixed to a garage wall. The fixed devices 402 also include electrical outlets and wall switches. Dynamic devices 404 are devices that can be moved. An example of a dynamic device is the lamp 168 of FIGS. 1 and 2, which can be unplugged from one room and moved to another room. The objects that are registered include the device objects 326 of FIG. 3, as well as computation objects 406. Computation objects 406 do not correspond to any particular device, but are used by daemons, applications, and other components of the automation system. Example computation objects include language parser objects and voice recognition objects.

Through the ABLS administration console 408, the user performs a one-time manual task of assigning unique addresses to the fixed devices 402, which registers the devices 402 with the ABLS 322. The unique address can be X10 addresses. Additional attributes may be entered to associate the devices 402 with physical-location attributes. For example, a wall switch in the garage can be indicated as the "garage wall switch," in addition to having a unique address. Dynamic devices 404 have their device attributes announced to the ABLS 322 when they are plugged in and switched on, through the device daemons 328 that act as proxies for the devices 404. Device objects 326 for the dynamic devices 404 are instantiated when an application requests to control the devices 404. The objects 326 can persist for a length of time, so that repeated requests do not require repeated instantiation. The device objects 326 are instantiated by the NBLS 320. Smart devices 208 perform their own registration with the ABLS 322. Computation objects 406 are instantiated by the NBLS 320, and require a software component or service referred to as the computation object installer 420 to register with the ABLS 322.

Figure 5:
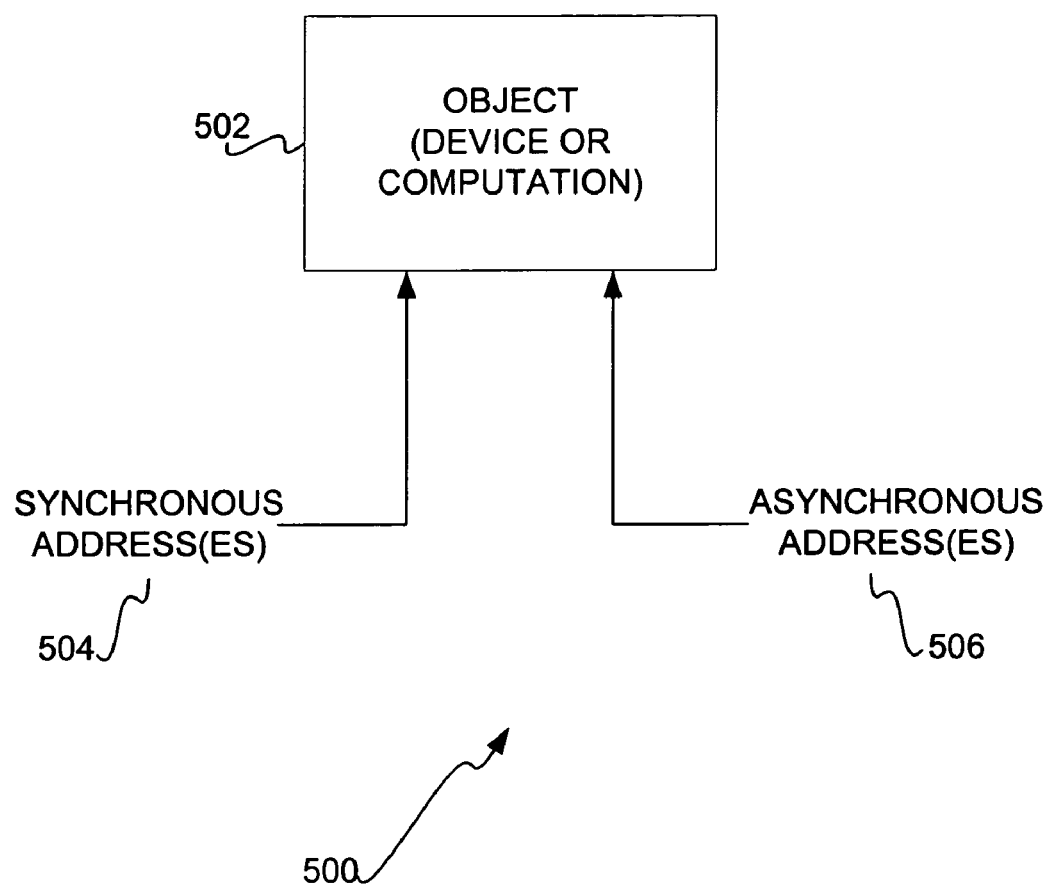
FIG. 5 is a diagram showing how an object of FIG. 4 can be addressed in two different ways.

FIG. 5 is a diagram 500 showing how one embodiment addresses an object 502 in two different ways. The object 502 can be one of the device objects 326 of FIG. 4, or one of the computation objects 406 of FIG. 4. The object 502 has one or more synchronous addresses 304, and one or more asynchronous addresses 306. The synchronous addresses 504 can include an address in the form of a marshaled distributed-object interface pointer, or another type of reference that enables real-time communication with the object 502. The asynchronous addresses 306 can be in the form of a queue name, a marshaled handle to a queue, or other address. The asynchronous addresses 306 are used to asynchronously communicate with the object 502 when it is temporarily unavailable or too busy, or when synchronous communication is otherwise not desired.

Referring back to FIG. 4, in summary, the ABLS 322 of the look-up services 310 maintains a database of available devices and sensors. The ABLS 322 supports queries based on combinations of attributes, and returns unique names of the devices and sensors that match the queries. By allowing identification of devices and sensors by their attributes and physical locations, instead of by their unique addresses, the ABLS 322 enables user-friendly device naming. For example, the user can identify a device as "the lamp on the garage side of the kitchen," instead of by its unique address. The NBLS 320 of the look-up services 310 maps unique names to object instances identified by those names. The NBLS 320 is optionally extensible to allow mapping of a unique name to multiple object instances. Both the ABLS 322 and the NBLS 320 are robust against object failures and non-graceful termination because they are based on the soft-state store 316 of FIG. 3.

Figure 6:
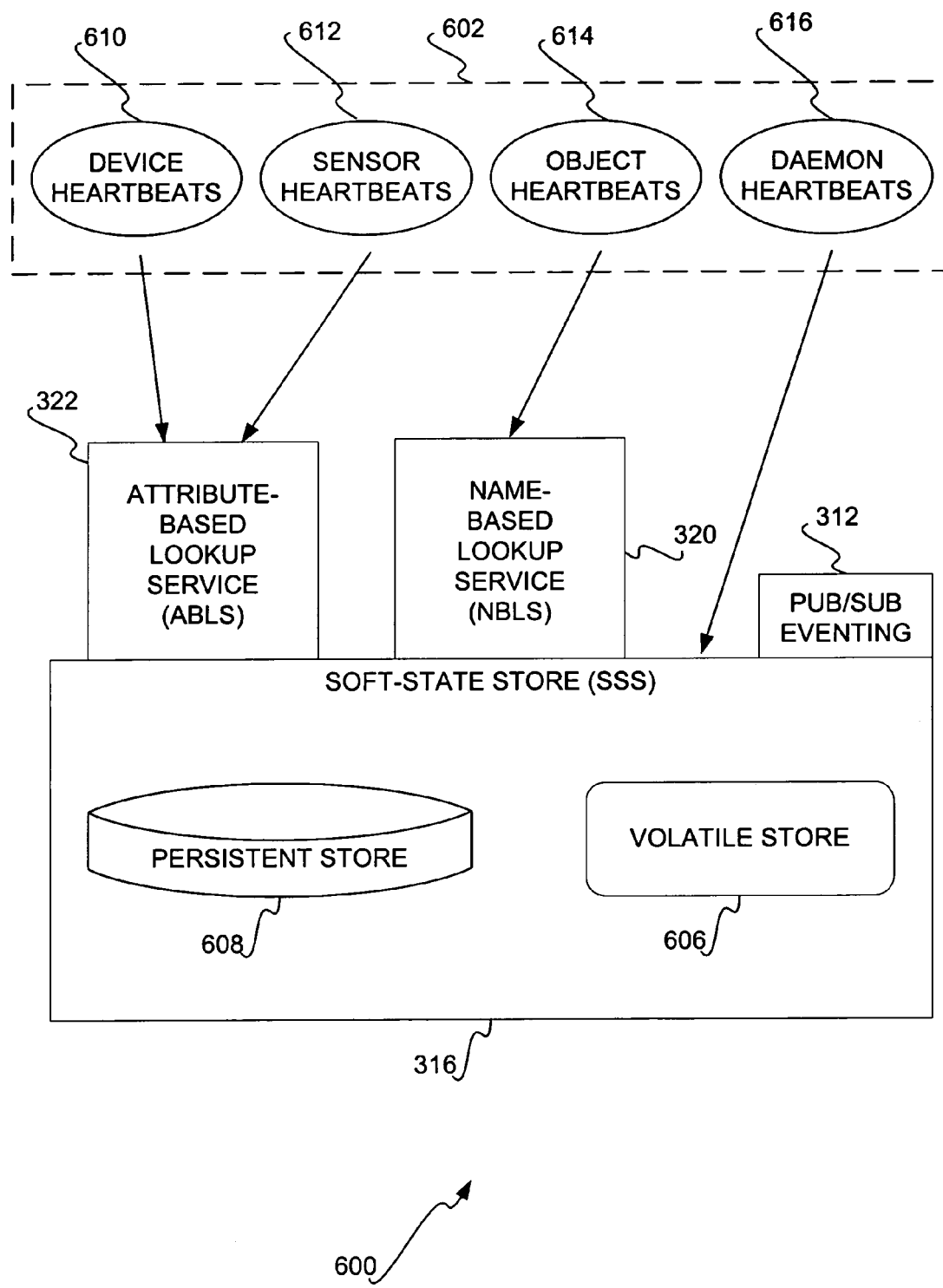
FIG. 6 is a diagram showing the soft-state store of FIG. 3 in more detail.

FIG. 6 is a diagram 600 showing one embodiment of the soft-state store (SSS) 316 in more detail. The SSS 316 uses a persistent, or non-volatile, store 608, and a volatile store 606. The persistent store 608 is used in addition to the volatile store 606 to save soft-state variables over failures, such as system crashes. The persistent store 608 can be a hard disk drive, non-volatile memory such as flash memory, or other non-volatile storage. The volatile store 606 can be volatile memory, such as random-access memory, or other volatile storage.

The SSS 316 ultimately receives heartbeats 602, and stores them as soft-state variables in either the persistent store 608 or the volatile store 606. The heartbeats 602 are periodic refreshes from devices, sensors, objects, and daemons, so that the automation system knows they are still operating. The heartbeats 602 include device heartbeats 610, sensor heartbeats 612, object heartbeats 614, and daemon heartbeats 616. The refresh rates of the heartbeats 602 vary by their type. The daemon heartbeats 616 may be received over intervals of seconds. The object heartbeats 614 may be received over intervals of tens of seconds to minutes. The sensor heartbeats 612 may be received over intervals of minutes to hours. The device heartbeats 610 may be received over intervals from hours to days.

The device heartbeats 610 and the sensor heartbeats 610 are received by the SSS 316 through the ABLS 322, while the object heartbeats 614 are received by the SSS 316 through the NBLS 320. The SSS 316 directly receives the daemon heartbeats 616. When an entity does not send a heartbeat as required by its refresh rate, the entity ultimately times out and is removed from the ABLS 322 and the NBLS 320. An entity in this context refers to a device, sensor, object, or daemon.

The SSS 316 preferably performs soft-state variable checkpointing. For a given refresh rate threshold, heartbeats that occur above the threshold, and thus are updated with high frequency, remain in the volatile store 606, to decrease overhead. Recovery of these high-frequency heartbeats from failure of the SSS 316 is through new refreshes. Conversely, heartbeats that occur below the threshold, and thus are updated with low frequency, are persisted in the persistent store 608. Recovery of these low-frequency heartbeats from failure of the SSS 316 is through restoration of the persistent soft-state variables in the store 608. This is because waiting for the next heartbeat may take too long. Downtime of the SSS 316 is preferably treated as missing refreshes for the soft-state variables.

The publication/subscription eventing component 312 allows subscriptions to events resulting from the change, addition, or deletion of the soft-state variables maintained by the SSS 316. The subscribers can include applications, daemons, and other software components of the automation system. The eventing component 312 sends events to subscribers when the kinds of changes to the SSS 316 match their corresponding event subscriptions. The component 312 receives the changes in the soft-state variables from the SSS 316. From these changes, it formulates events as necessary.

Figure 7:
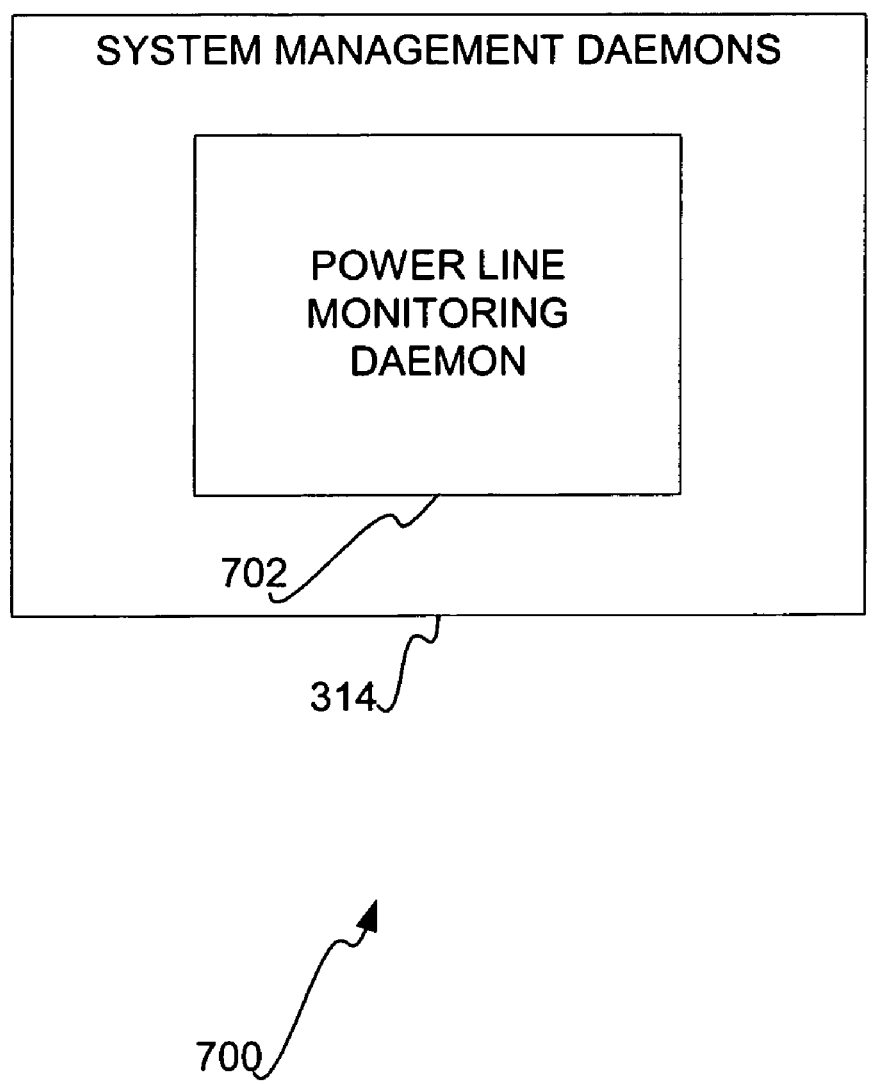
FIG. 7 is a diagram showing a power line monitoring daemon as one example of the system management daemons of FIG. 3.

FIG. 7 is a diagram 700 showing one embodiment of the system management daemons 314 of FIG. 3 in more detail. In particular, the system management daemons include a power line monitoring daemon 702. The power line monitoring daemon 702 detects reliability, security, and other problems with automation system devices that use the power line. The daemon 702 can use pattern-based detection for detecting unacceptable power line activity, model-based detection for detecting acceptable power line activity, or both. Pattern-based detection employs a database of unacceptable power line patterns that, if detected, trigger an event. For example, faulty devices and external interferences may produce meaningless repetitions or interleaving of commands. By comparison, model-based detection employs a model of acceptable power line patterns. Power line patterns that do not conform to the model also trigger an event.

Figure 8:
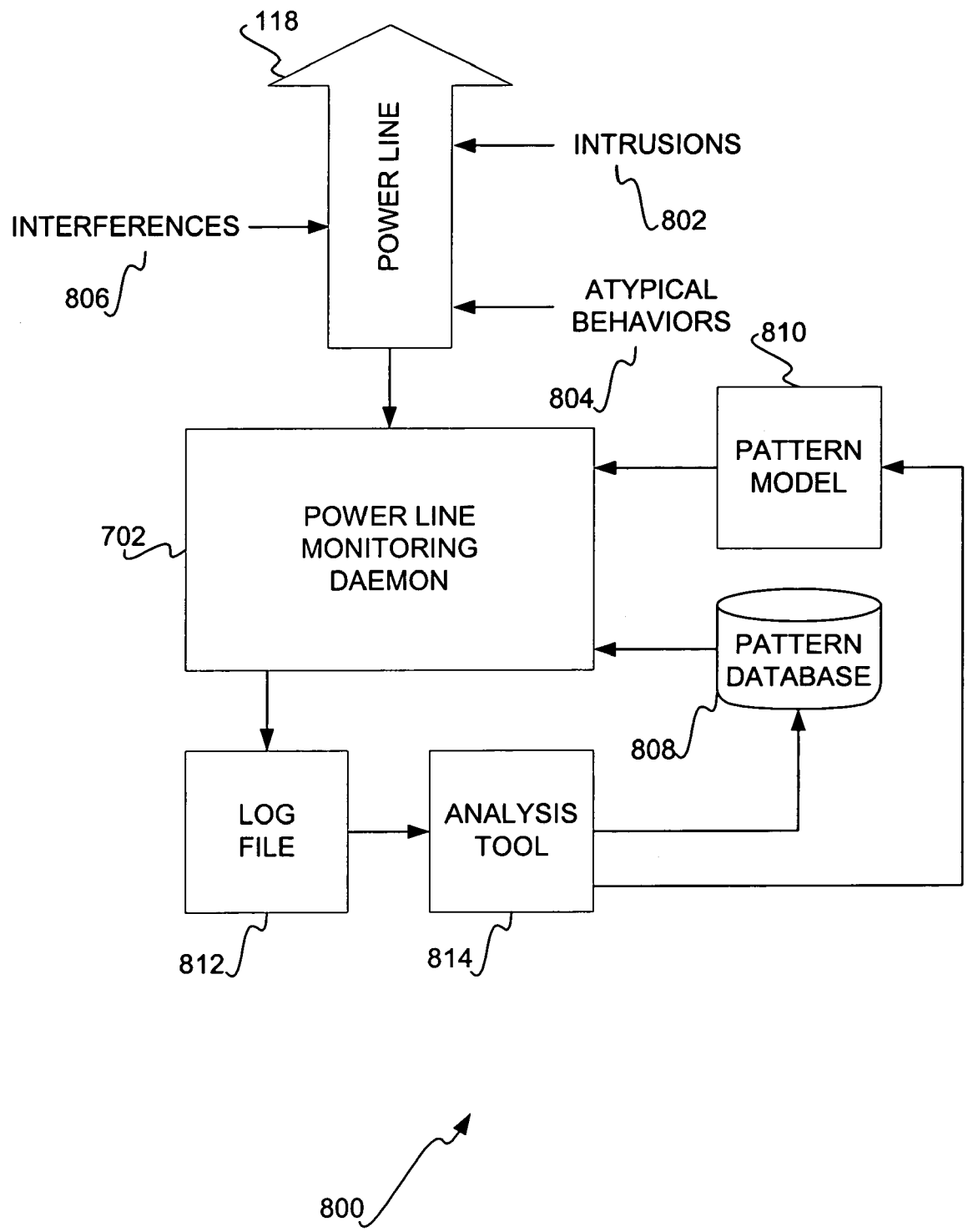
FIG. 8 is a diagram showing how the power line monitoring daemon of FIG. 7 detects patterns from the power line.

FIG. 8 is a diagram 800 showing how one embodiment uses the power line monitoring daemon 702 to detect problems on the power line 118. The daemon 702 monitors the power line 118 for problems that result from intrusions 802, atypical behaviors 804, and interferences 806. The daemon 702 matches patterns from the power line 118 against unacceptable power line patterns stored in the pattern database 808. The daemon 702 also tests the patterns against the pattern model 810 of acceptable power line patterns. If matching the patterns against the unacceptable power line patterns stored in the database 808 yields a positive match, or testing the patterns against the model 810 of acceptable power line patterns yields a negative test, the daemon 702 generates an event. The event corresponds to the situation that an unacceptable pattern has been detected on the power line 118. Other daemons, objects, and programs can subscribe to the event through the eventing component 312, which is not specifically called out in FIG. 8.

The monitoring daemon 702 maintains a log file 812 of all detected power line patterns. The patterns stored in the log file 812 include both acceptable and unacceptable power line patterns. An analysis tool 814 can be used by a user to determine whether to add new unacceptable power line patterns to the database 808, based on the patterns stored in the log file 812. The analysis tool 814 can also be used to determine whether the model 810 of acceptable power line patterns should be modified, based on the patterns stored in the log file 812.

Figure 9:
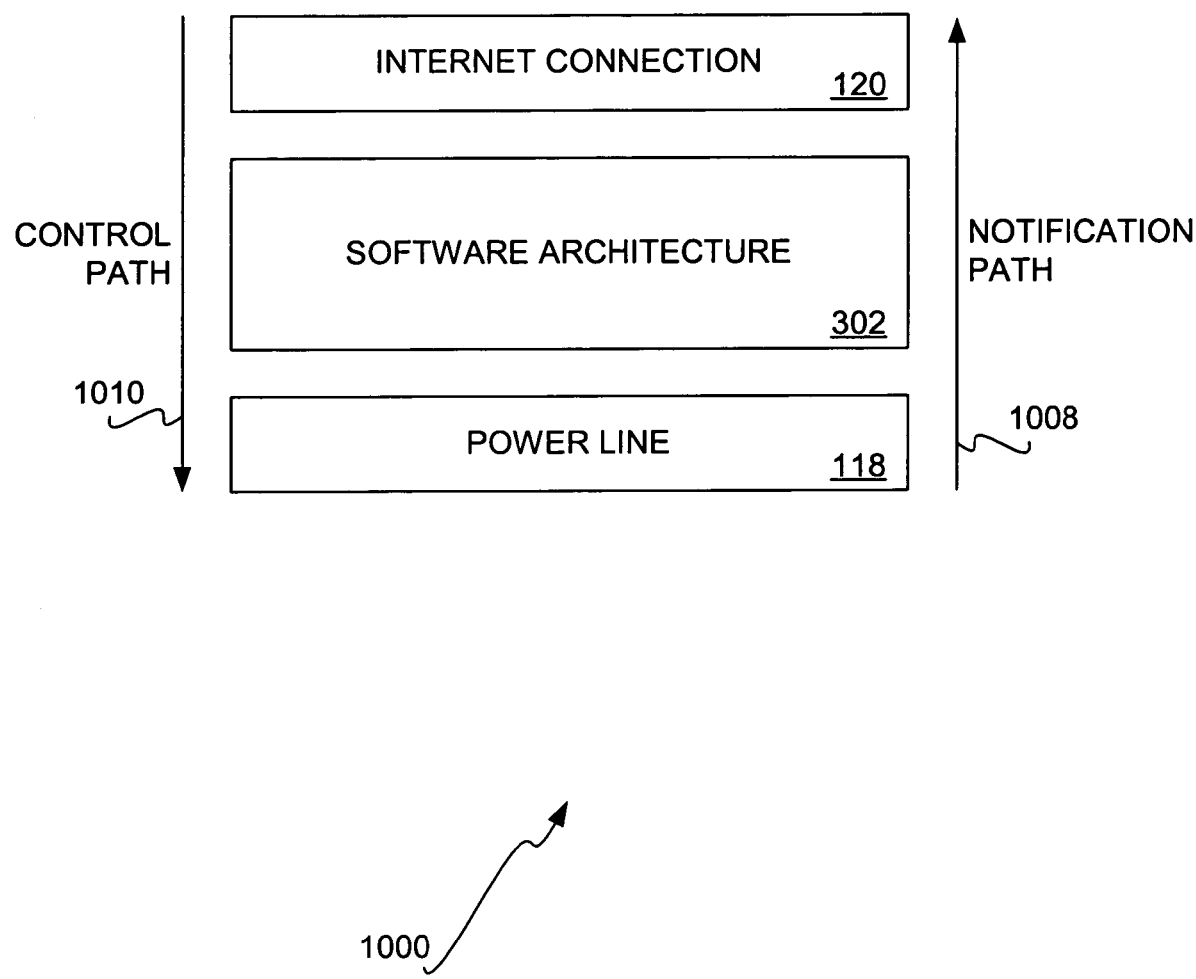
FIG. 9 is a diagram showing an abstract, high-level view of the software architecture of FIG. 3.

As a summary of the software architecture described in this section of the detailed description, FIG. 9 is a diagram 1000 showing a high-level view of the architecture. The software architecture 302 resides between the power line 118 and the Internet connection 120. The architecture 302 abstracts the manner by which the devices connected to the power line 118 are accessed and controlled. The Internet connection 120 provides for remote, off-site access and control of devices connected to the power line 118, through the architecture 302. The notification path 1008 indicates that notifications from the devices connected to the power line 118 move up to the software architecture 302. The notifications can also move up to the Internet connection 120 in the case of remote, off-site access and control of the devices. The control path 1010 indicates that control of the devices originates either from the Internet connection 120 or at the architecture 302, and moves down to the power line 118 to reach the devices.

Weak Leader Election Approach

For each system management or other daemon described in the previous section of the detailed description, there can be more than one instance of the daemon for redundancy purposes. For example, an instance of the power line monitoring daemon may reside on each of the system devices over which the automation system is implemented. If one of the system devices fails, the redundancy ensures that the automation system itself does not fail. For a number of instances of the same daemon, a leader daemon instance must be determined. The leader daemon instance is the active instance, which responds to requests to the daemon. The other instances do not respond. If the leader instance fails, then another instance becomes the new leader instance.

Figure 10:
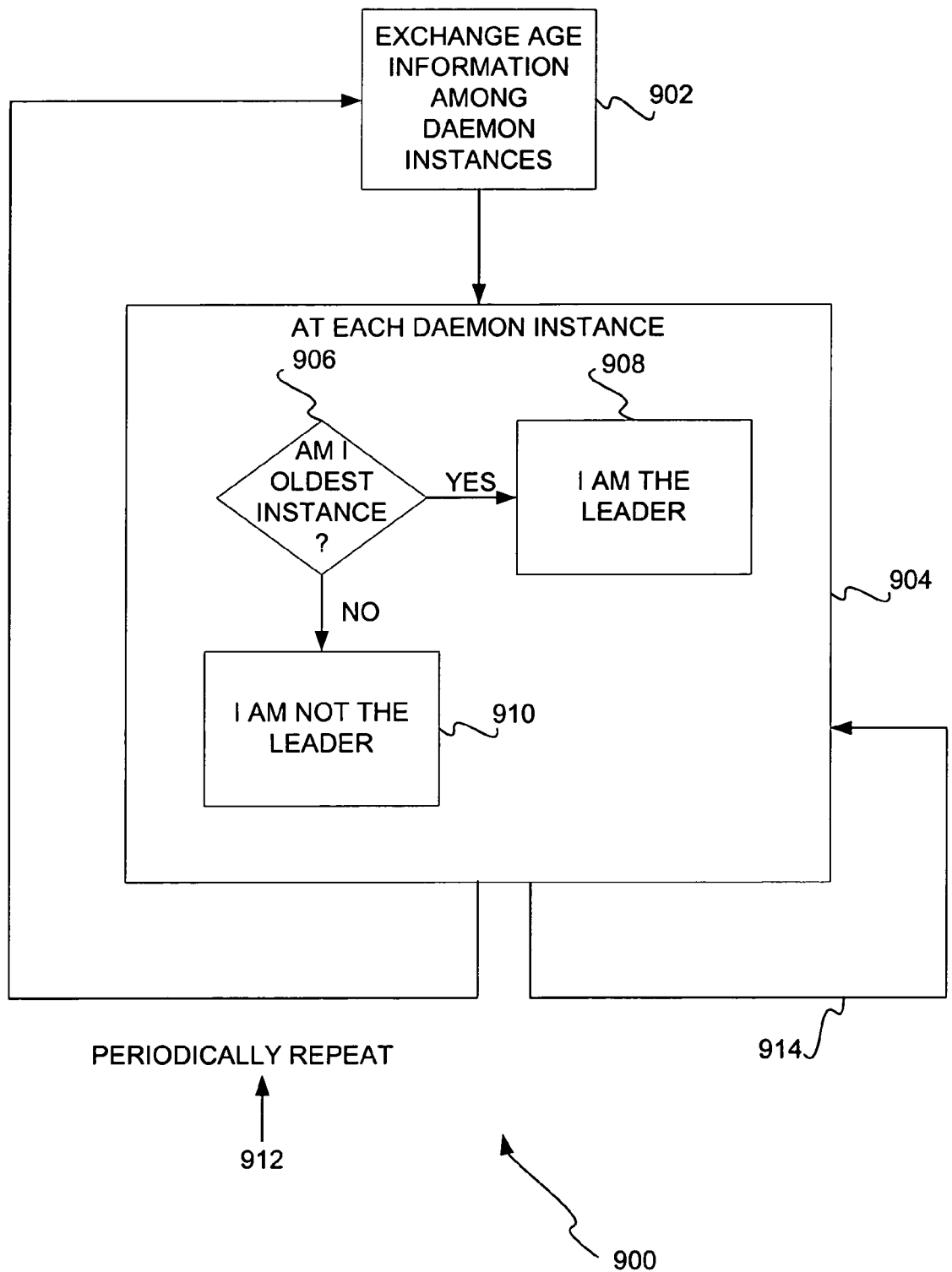
FIG. 10 is a flowchart of a weak leader election method by which a number of daemon instances determine which instance is the leader instance, according to an embodiment of the invention.

FIG. 10 is a flowchart of a method 900 showing how one embodiment determines which of a number of daemon instances is the leader instance. The method 900 is specifically a weak leader election approach. The approach is weak in that only the leader instance knows that it is the leader instance. Other instances only know that they are not the leader instance. Weak leader election reduces the coordination that is necessary among the daemon instances. Requests made to the daemon are multicast to all instances of the daemon, but only the leader instance responds.

The description of the method 900 is specific to redundant daemon instances. However, the method 900 itself is more general, and can be applied to any type of redundant nodes. Redundant nodes can be the redundant daemon instances, as well as redundant software programs, redundant software processes, redundant software objects, or other redundant software components. The redundant nodes can also be hardware nodes, such as redundant servers, redundant clients, redundant devices, and other redundant hardware nodes.

In 902, age information is exchanged among all the instances of a daemon. The age information can include, for example, how long each instance has been online. At each instance, 904 is performed. Specifically, in 906, each daemon instance determines whether it is the oldest instance, based on the age information received from the other daemon instances in 902. If a daemon instance determines that it is the oldest instance, then, in 908, the instance concludes that it is the leader instance. Otherwise, in 910, the daemon instance concludes that it is not the leader instance. The method 900 is periodically repeated, as indicated by the arrow 912. Furthermore, as indicated by the line 914, when any daemon instance has detected that a failure has occurred which may have affected the leader instance, 904 is immediately performed again. Determining by a daemon instance as to whether it is the oldest instance is one type of criteria that can be used to determine which instance is the leader instance. Other criteria can also be used.

In applications where each redundant node maintains a server replica and clients contact the nodes to obtain service, weak leader election reduces the coordination needed among the nodes, as well as the coordination needed between the clients and the nodes. This reduction is accomplished by having the clients contact all the nodes, such as by multicasting requests to all nodes. The clients then do not have to deal with leader node failure, nor does the leader node have to coordinate with the other nodes regarding the requests.

The weak leader election approach is distinguished from strong leader election, in which each node knows who the leader node is.

A lookup protocol that is based on the described weak leader election approach can be formulated. The protocol is formulated first with respect to the relatively simple case of optimistic high-frequency updates, but dealing only with common failures. The protocol is then augmented to accommodate pessimistic, low-frequency updates, and further augmented to cover rare failures. Finally, lookup service performance is improved by dynamically adapting the frequency of updates.

The baseline high-frequency protocol, dealing with common failures only, is a cold-start lookup service. Optimistic provider updates are referred to as provider refreshes, and are multicast periodically. An upper bound is assumed of Max_Volatile_Refresh_Interval on the refresh period. The term "Volatile" indicates that this data can be kept in volatile storage. The lookup service runs on one node, the leader node. Providers optimistically expect the leader node to perform the refreshes, and do not receive acknowledgements that their refreshes have been performed. Client queries are multicast to all the nodes, but only the leader node responds. Should an update message be lost, the lookup service provides stale information. The maximum staleness is 2 Max_Volatile_Refresh_Interval+$\delta$. The value $\delta$ is a statistical minimum of the time difference between query initiation time and the most recent refresh prior to the query for which the lookup service can guarantee fresh, 0-stale information. Max_Volatile_Refresh_Interval+$\delta$ is a theoretical lower bound for maximum staleness.

Should the leader node fail, service is restored on a non-failed node. Leader election is achieved by having each node independently check whether it is the new leader node when failure of the leader node is detected. Upon leader failover, the new leader initializes for a period of Max_Volatile_Refresh_Interval, during which the lookup data is reestablished and after which all queries are performed correctly. The service outage due to node failure has a duration of 3 SS_Heartbeat_Interval+Max_Volatile_Refresh_Interval.

The maximum staleness of the data received in response to a query is 3 SS_Heartbeat_Interval+2 Max_Volatile_Refresh_Interval+$\delta$.

The improved protocol is a hot-start lookup service that reduces the maximum staleness of the previous protocol by maintaining a fixed set of live, or hot, spare nodes. Each hot spare node performs all refreshes, but hot spare nodes do not respond to queries unless they are elected leader. If a hot spare node is available during leader failover, the maximum staleness is reduced to Max_Volatile_Refresh_Interval+$\delta$. The maximum staleness in the case of message loss remains unchanged. The overall maximum staleness is reduced to 2 Max_Volatile_Refresh_Interval+$\delta$.

The hot-start lookup protocol works correctly if nodes leave but do not rejoin the set of hot nodes. If a hot node fails and then recovers, however, multiple nodes may concurrently become the leader. To prevent this situation from occurring, the protocol is augmented with a join method that each node executes when it wishes to become a hot spare node. The join method works as follows. Before joining, each node multicasts a "Can I Join" message. The leader node, if there is one, determines whether the node may join. The protocol attempts to maintain at most t+1 hot nodes, where t>0, and the leader node answers with a yes or no response accordingly. The requesting node times out if it does not receive a response. The node then waits for 3 SS_Heartbeat_Interval time, and retries twice more. The maximum staleness of the high-frequency protocol remains as 2 Max_Volatile_Refresh_Interval+δ, and its maximum outage length is 3 SS_Heartbeat_Interval.

Example Computerized Device

Figure 11:
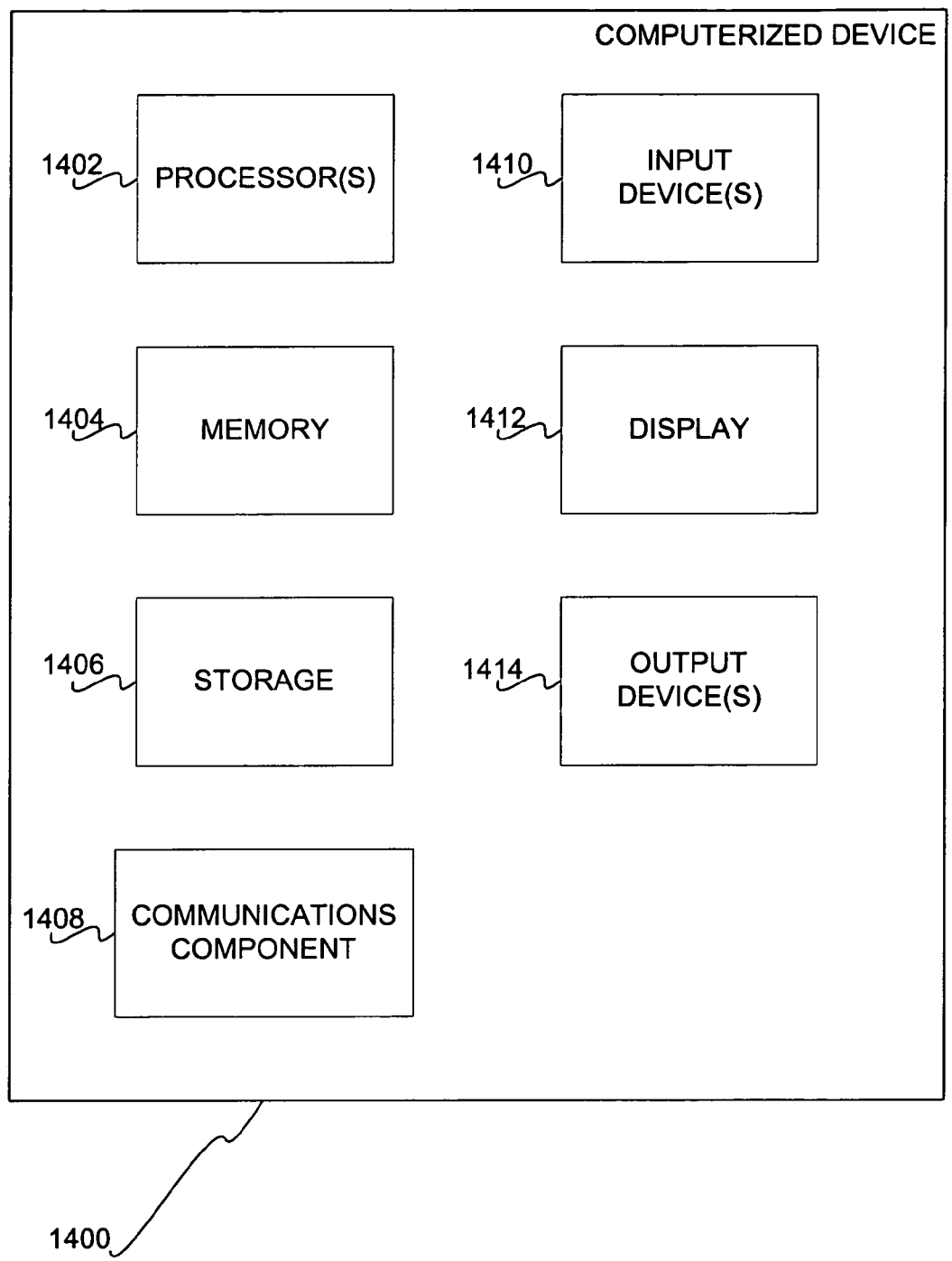
FIG. 11 is a diagram of an example computerized device that can be used to implement an automation system.

The automation system can be implemented within a computerized environment having one or more computerized devices. The diagram of FIG. 11 shows an example computerized device 1400. The device 1400 can implement one or more of the system devices 204 of FIG. 2, or one or more of the user access points 206 of FIG. 2. The example computerized device 1400 can be, for example, a desktop computer, a laptop computer, or a personal digital assistant (PDA). The system may be practiced with other computer system configurations as well, including multiprocessor systems, microprocessor-based or programmable consumer electronics, network computers, minicomputers, and mainframe computers. The system may be practiced in distributed computing environments where tasks are performed by remote processing devices that are linked through a communications network.

The device 1400 includes one or more of the following components: processor(s) 1402, memory 1404, storage 1406, a communications component 1408, input device(s) 1410, a display 1412, and output device(s) 1414. For a particular instantiation of the device 1400, one or more of these components may not be present. For example, a PDA may not have any output device(s) 1414. The description of the device 1400 is to be used as an overview of the types of components that typically reside within such a device, and is not meant as a limiting or exhaustive description.

The processor(s) 1402 may include a single central-processing unit (CPU), or a plurality of processing units, commonly referred to as a parallel processing environment. The memory 1404 may include read-only memory (ROM) and/or random-access memory (RAM). The storage 1406 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 1400 may operate in a network environment. Examples of networks include the Internet, intranets, extranets, local-area networks (LAN's), and wide-area networks (WAN's). The device 1400 may include a communications component 1408, which can be present in or attached to the device 1400. The component 1408 may be one or more of a network card, an Ethernet card, an analog modem, a cable modem, a digital subscriber loop (DSL) modem, and an Integrated Services Digital Network (ISDN) adapter. The input device(s) 1410 are the mechanisms by which a user provides input to the device 1400. Such device(s) 1410 can include keyboards, pointing devices, microphones, joysticks, game pads, and scanners. The display 1412 is how the device 1400 typically shows output to the user. The display 1412 can include cathode-ray tube (CRT) display devices and flat-panel display (FPD) display devices. The device 1400 may provide output to the user via other output device(s) 1414. The output device(s) 1414 can include speakers, printers, and other types of devices.

The methods that have been described can be computer-implemented on the device 1400. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. In a distributed system including a plurality of redundant components, a method for leader election by a first redundant component, comprising:

multicasting age information, wherein the age information includes a duration of time on-line, particular to the first redundant component to all other components in the plurality of redundant components, the age information relating to one or more criteria according to which a currently-active leader component is to be determined;

receiving age information from each other component in the plurality of redundant components particular to each component and relating to the one or more criteria according to which the currently-active leader component is to be determined; and determining whether the first redundant component is the currently-active leader component by comparing the age information particular to the first redundant component with the age information received from each of the redundant components, wherein if the first redundant component determines that it is not the currently-active leader component, the first component knows one of the components in the plurality of redundant components is the currently-active leader component.

2. The method of claim 1, further comprising periodically repeating the method.

3. The method of claim 1, wherein the determining whether the first component is the currently-active leader component comprises determining whether the first component is an oldest component.

4. In a computer system including a plurality of redundant components, a method for electing a currently-active leader component, comprising:

multicasting currently-active leader election criteria information among all the plurality of redundant components; and at each component in the plurality of redundant components:

a) determining whether the component is the currently-active leader component, based on a currently-active leader election criteria information received from all the other components in the plurality of redundant components, wherein the currently-active leader election criteria information includes age information, wherein the age information includes a duration of time on-line; and b) repeating the determining whenever the component detects an occurrence of a failure that has a potential to affect the currently-active leader component.

5. The method of claim 4, further comprising: periodically repeating the method.

6. The method of claim 4, wherein the determining whether the component is the currently-active leader component comprises:

determining whether the component is an oldest component; and if the component determines that it is the oldest component, concluding that the component is the currently-active leader component.

7. The method of claim 4, wherein the multicasting age information includes multicasting information regarding how long each component in the plurality of redundant components has been online.

8. The method of claim 4, wherein the redundant components are redundant instances of a daemon.

9. The method of claim 8, wherein the daemon is a system management daemon.

10. The method of claim 8, wherein the daemon is a power line monitoring daemon.

11. The method of claim 4, wherein the redundant components are redundant executing processes.

12. The method of claim 4, wherein the redundant components are redundant class objects.

13. The method of claim 4, wherein the redundant components are redundant devices in an automation system.

14. The method of claim 4, wherein the redundant components are redundant nodes in a network.

* * * * *